Oct. 29, 1929.  J. SCHMIDT  1,733,757
MACHINE FOR GRADING GLOBULAR ARTICLES
Filed May 2, 1925  3 Sheets-Sheet 2
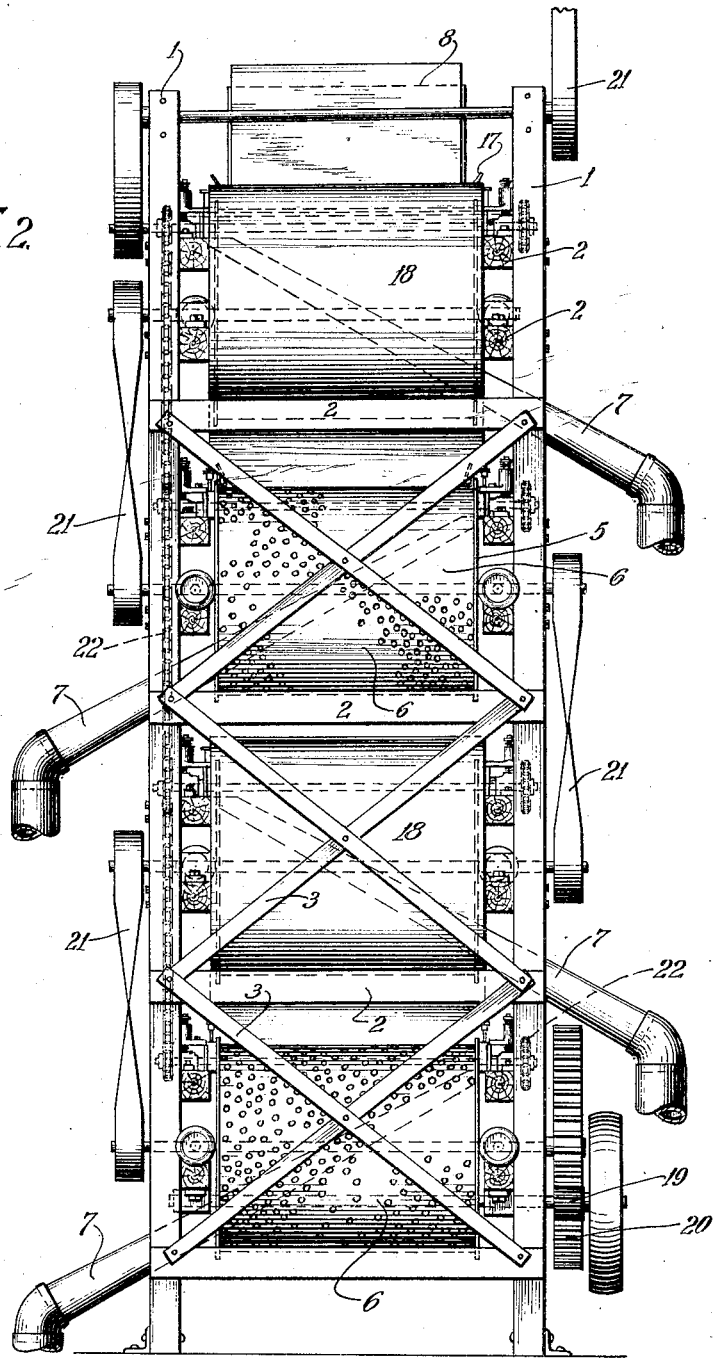

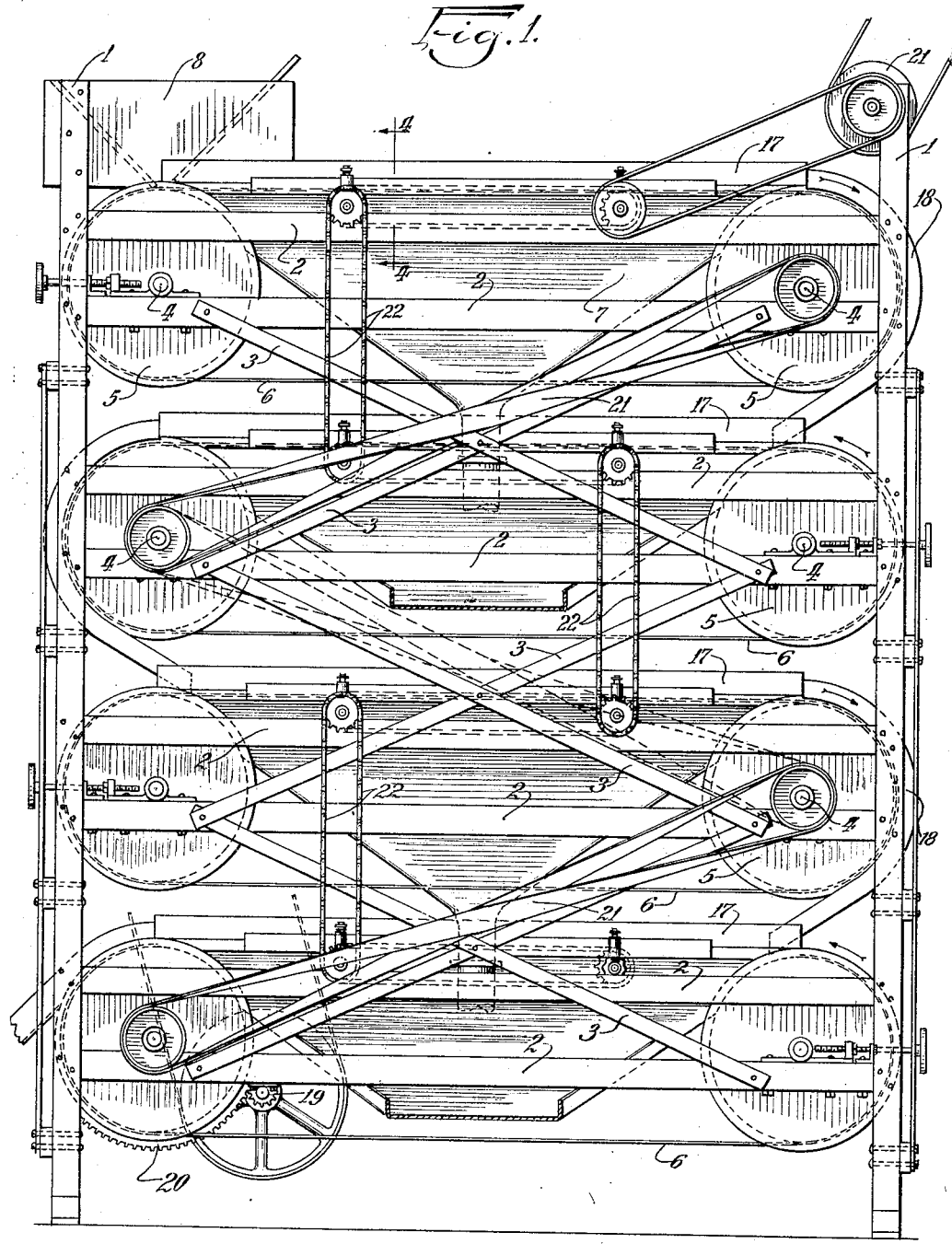

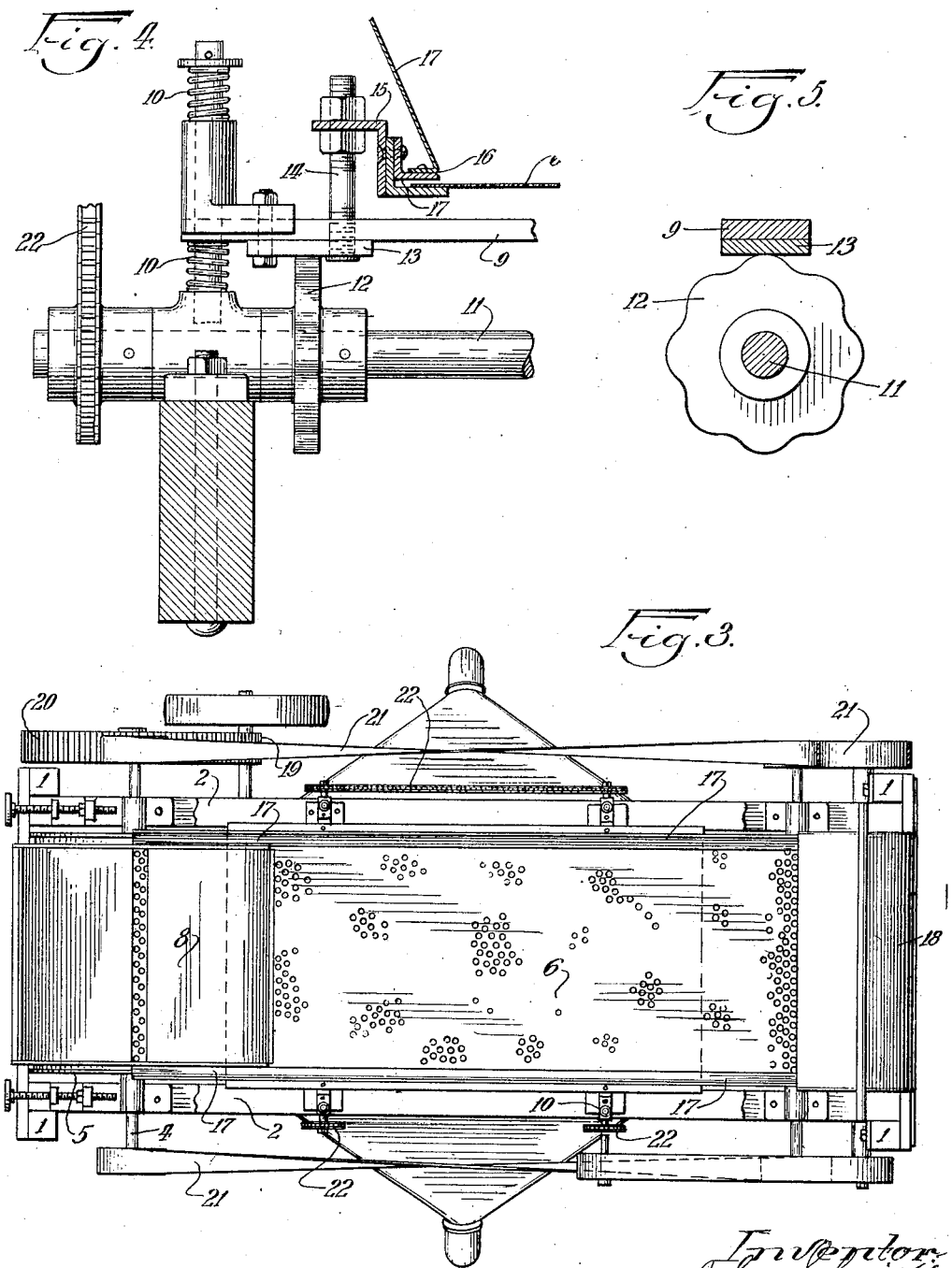

Patented Oct. 29, 1929

1,733,757

UNITED STATES PATENT OFFICE

JOHN SCHMIDT, OF HOOPESTON, ILLINOIS, ASSIGNOR TO SPRAGUE-SELLS CORPORATION, OF HOOPESTON, ILLINOIS

MACHINE FOR GRADING GLOBULAR ARTICLES

Application filed May 2, 1925. Serial No. 27,545.

This invention relates to an apparatus particularly adapted to the grading and sizing of green peas for canning purposes, but is as well adapted to the handling and grading of globular articles of any type or character.

Referring particularly to green peas as handled in canning factories, it will help materially to differentiate the manifold advantages and importance of my invention if I give a brief description of the present apparatus for handling and grading these and similar products.

Green peas are gathered from the fields by means of cutting the vines with the pods and hauling them in bulk to the canning factory where they are placed in a large machine that is technically known as a "pea viner".

This machine manipulates the vines and pods in a manner to break the pods and release the peas which roll down and out of the machine where they accumulate in bulk and mixed sizes.

In passing this mass of peas through a canning line they are treated by what is termed a grader, by means of which they are supposed to be separated into the grades known as 1's, 2's, 3's, 4's, 5's and 6's.

The present most generally used machine for this purpose comprises a very large, long revolving perforated cylinder.

The perforations at the end where the peas enter this cylinder are the smallest and are of a size to permit the small No. 1 select and tenderest peas to pass quickly through and thus protect them from possible mutilation and crushing from rolling around with the larger and more hardened product.

The perforations in this cylinder grow gradually larger toward the exit end, so that, in theory at least, the various sizes of peas will find the first openings through which they may freely pass and thus be automatically graded into the commercial sizes noted.

In practice, however, the grading by this method and this machine falls far short of theory and expectation.

It is about normal operation for a pea canning factory to run 100 No. 2 cans per minute. This speed requires that the machines constituting a pea canning line produce a sufficient number of peas of the various sizes to permit of continuous operation.

The grader, therefore, must continuously handle a considerable bulk of mixed sizes of peas and a certain speed of rotation must be given the large circular screen to produce the grades in such quantity as may be needed.

It is found in practice that the mass of mixed peas passing into and through the grader have a decided tendency to climb up the side of the rotating screen and then tumble back over each other.

The rotary screen being inclined toward the exit end the mass of mixed, rolling and tumbling peas gradually work downward toward the low end of the screen, but instead of moving down in a comparatively straight path, the mass of moving peas follows a more or less sinuous path which adds to the difficulties of separation by this method.

Since a considerable quantity of peas pass through the grader in a continuous stream, the small No. 1 peas that bring the highest price, are more or less entrapped in the mass and may fail to find the small openings through which they are supposed to pass and are thereby carried along as far as the center of the cylinder before they finally get out, and then they are with one of the larger grades and are lost to the canner since they will bring only the price of second or third grade peas.

This entrapping of the small tender peas in the mass also entails another loss to the canner in crushed and mutilated product, which would not occur, or would at least be very materailly decreased if the small peas would have been able to get through the screen where intended.

This method of grading with its mutilation and crushing of the tender peas requires a picking table at each discharge point of the grader which materially increases the installation expense and the labor cost of handling the product, since the crushed and mutilated peas must be removed from the graded sizes or they will lower the grade.

To obviate all of the foregoing difficulties and undesirable features of the present method of grading peas I have evolved the apparatus and method disclosed in this application.

The apparatus part of the invention comprises a series of perforated belts arranged in superposed relation and moved in such a manner that a mass of mixed peas deposited on the uppermost belt of the series will be spread out into a thin stratum and gradually moved in a horizontal direction and agitated in a manner to bring all of the peas in the stratum into surface contact with the perforated belt; transferring those that are too large to pass through the perforations, to the next lowermost belt of the series and successively repeating this operation on the other belts of the series until the entire quantity of peas being handled have been graded and segregated into the desired grades as to size.

The operation of my invention consists in spreading into a thin stratum, the continuously moving mass of mixed grades of peas; agitating the peas to produce a constant remixing of the mass while in the thin stratum and thereby bring all of the peas in the stratum into repeated contact with the grading screens, thus permitting all of a size capable of passing through a screen, to so pass and become separated and segregated into a predetermined grade.

It is therefor, a principal object of my invention to provide means for spreading a mass of mixed peas into a thin stratum on a perforated screen and agitate the screen to constantly remix the peas and thereby bring all into contact with the screen surface whereby a grading as to size will be effected.

It is a further object of my invention to provide an apparatus having a plurality of screen members arranged in operative relation whereby a mass of mixed peas are successively subjected to a screening action to separate and segregate them into graded sizes.

It is a further object of my invention to provide an apparatus of simple and inexpensive construction, that will have large capacity; occupy small floor space and require the minimum of power to operate.

It is also an object of the invention to provide a series of screens in the shape of endless belts, superposed one over the other and connected by suitable chutes whereby the mass of peas are gradually carried along by each endless screen and those that do not pass through the perforations of that screen are deposited onto the belt next below and the screening action repeated, with enough screens in the series to effectively separate the various desired grades as they pass through the machine.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it understood that the several necessary elements and combinations constituting the same, may be varied in their proportions, placement, general relation and operative arrangement without departing from the scope and nature of the invention.

In carrying out the objects of my invention in a concrete form or apparatus, further objects, improvements and advantages have been evolved than have been recited, and in order to make the invention more clearly understood there are shown in the accompanying drawings means and mechanism embodying the preferred structural arrangement and the preferred disposition of the different parts and combinations, without limiting the claims to the exact details of the construction shown, in which I have simply illustrated one way of embodying the creative part or concept of the invention in a concrete form of apparatus. The described devices are simply embodiments of the invention which other structures might also employ and some of the parts or combinations of parts may be used without the others in different types of such machines without departure from the purview of my invention and I regard myself as entitled to such variations from the shown and described devices as fall within the scope and meaning of the claims hereto appended.

Reference now being had to the accompanying drawings a better understanding of the invention will be had with the thought in mind that the said drawings are more or less diagrammatic in character; are not necessarily drawn to scale, neither do they necessarily represent the best or the preferred practices in connection with the construction of machines of this character, also that the proportions and relations of some of the parts may be more or less exaggerated in size and shape to better illustrate the application of the invention to an operative machine.

Fig. 1 is a side elevation of the machine showing very clearly the disposition of the endless screens and their manner of mounting; the means for driving the various operative elements; the disposition of the chutes for receiving and conveying the peas from one operative station to the next and the chutes for receiving and discharging the graded peas as they fall through the several grading screens, also the means for agitating the grading screens.

Fig. 2 is an end elevation of the machine showing the various parts and operative elements in the same relative positions as in Fig. 1, but showing more clearly the receiving and discharge chutes for the graded peas.

Fig. 3 is a plan of Fig. 1 with the various parts and elements in the same relative positions as in the previous figures.

Fig. 4 is a sectional detail of one of the screen agitating elements taken on approximately the line 4—4 of Fig. 1.

Fig. 5 is a side elevation in detail of the agitating cam.

The general construction of the apparatus comprises vertical frame members 1, tied together into a rectangular frame by the cross members 2, and stiffened into a rigid structure by the angularly placed tie bars 3.

The machine illustrated is made up of four screening sections and is adapted to separate and grade a mass of peas into five distinct grades. This showing is entirely arbitrary, as it is easily understood that as many sections or grading stations may be provided for as is desired, it simply meaning the addition of as many sections as are desired for the product being treated.

The first grading station is at the extreme top of the machine and comprises oppositely disposed shafts 4 mounted to rotate in suitable bearings and carrying the drums 5 over which is trained an endless screen belt 6, having perforations of a size to permit the passage of the first size of peas it is desired to separate from the mass. Under some conditions of operation this first screen is provided with the smaller holes so that small and tender peas are first separated from the mass. As these small peas drop through the screen they fall into the receiving chute 7 and roll down and away from the machine. Arranged at the left of the machine is a receiving hopper 8 where all of the mixed peas are deposited and are distributed in a thin stratum onto the moving screen belt. As the thin stratum of peas is moved along with the belt 6 they are given a very rapid and slight agitation, which causes them to move around over the belt and be continuously remixed and brought into new contact with the perforations in the screen surface. The forward movement of the screen belt carrying the thin stratum of peas is approximately 15 feet per minute while the belt is given a vertical vibration of approximately 2000 impulses per minute. The vertical impulses are very slight and are so rapid that the thin stratum of peas is remixed many times during their travel along one belt and each pea in the mass is given many opportunities to get through a perforation if it is small enough to pass this screen. The agitating mechanism is best shown in Figs. 4 and 5.

An agitating bar 9 extends laterally across the machine just under the top portion of the endless screen and is mounted in a neutral position on the springs 10. The cross shafts 11 extend under and parallel with the bars 9 and carry on each end the agitating cams 12 which have operative contact with the bar 9 through the pad 13. Studs 14 carry angular members 15 and 16 which are mounted with a separation at 17 to give free entry to the edge of the screen belts. It is readily seen that if the cams 12 are given about 250 revolutions per minute there will be transmitted to the screens about 2000 impulses per minute, which will be short and rapid and will cause the thin stratum of peas on the screen to have a very rapid dancing motion. Side guard members 17ª tend to keep the peas from moving laterally off the screens.

The endless screen belt, preferably made of thin metal, moving forward slowly will carry the peas along and over the end into the guide chute 18 where all that could not pass through the perforations will fall onto the next screen belt below and be subjected to the same treatment as just described.

There will be some peas on the first belt, and in fact on each belt that will almost go through the holes and become wedged therein and must be removed therefrom before the belt approaches the hopper for the new supply of unscreened peas. The construction of this machine renders it practically self cleaning. The drums 5 bear closely against the belts as they pass therearound and any peas adhering in the perforations are pushed out and pass down the guide chute to the next screen below.

The screen belts are driven by means of the drive means shown at the lower left corner of Fig. 1, by means of the pinion and gear 19 and 20 and the crossed belts 21 running from section to section as shown.

The screen agitating mechanism is driven through the power means at 21 and the chains 22 as shown.

The manner of connecting up the driving means gives alternate motion to each adjacent screen belt so that the peas are carried in alternate directions as they pass through the machine, and as each size is screened away they are conveyed away from the machine to the next operation in the canning line.

Operation

Mixed grades of peas are delivered by any suitable means to the hopper 8 by means of which they are slowly delivered to the top grading screen in a thin stream or stratum. This top or first conveyor screen is endless and moves continuously in a forward direction to convey the thin stratum of peas flowing from the hopper in the direction of the arrow at the right of the top section in Fig. 1.

The perforations in this top endless conveyor screen are usually the smallest in the set of screens to separate the small and tender peas first to prevent bruising or mutilation from continued agitation and handling on the following screens.

The small peas passing through the reticulations of this first screen are collected by the chute 7 positioned thereunder and are conveyed away from the machine.

The peas that do not pass through the screen are carried over the screen and pass into the curved guideway 18 at the discharge end of the screen and are thereby deposited onto the top run of the screen belt or band located under the top screen and are by this band treated likewise to those of the top screen. The peas that get through the reticulations of this screen are led away from the machine by the chute underneath and those passing over the end of the screen are guided onto the screen below which operation is repeated a sufficient number of times to effect the desired fineness of grading.

To facilitate the grading on each screen and to give the peas a chance to get through the perforations in the screens, the agitating cams 12 rotating at a high speed impart to the top run of each screen band a very rapid vibration which causes the thin stream of peas to dance continuously during their trip across the belt with the result that every pea has a chance to get through the perforation if it is small enough to pass through. This rapid vibration prevents completely the bunching of the stream of peas and most effectively agitates the stream so that the grading is very effective and efficient, repeatedly presenting each pea to the perforation so that on each run of the conveyors the peas that should pass are separated with the least mutilation.

What I claim as new and desire to secure by Letters Patent is:

1. An apparatus for grading green peas comprising a conveying system arranged in superposed relation, means for distributing a stream of mixed sizes of peas over said system, means forming a part of said system for segregating peas of like sizes, yieldingly mounted means for supporting portions of said conveying system and means for agitating said supported portions to more perfectly segregate the different sizes of peas.

2. An apparatus for grading green peas comprising means for distributing a mass of mixed sizes of peas, grading means comprising an endless conveyor for receiving said mixed mass, means for giving continuous conveyor movement to said grading means, yielding means supporting the portion of said conveyor on which the said mass of peas is deposited, independently driven means for imparting a very rapid vertical agitation to said yielding means to thereby agitate said conveyor and effect a more thorough separation of the said mass of peas.

3. An apparatus for grading green peas into uniform sizes comprising a series of superposed conveying means moving in alternate directions and successively receiving and moving a mass of mixed sizes of peas, said conveying means being provided with a series of graduated openings through which peas of the desired sizes will pass, yielding means supporting the upper run of each of said conveyors with means for imparting a rapid agitation to said yielding means to more perfectly segregate the different sizes of peas from the said mass.

4. An apparatus for grading green peas comprising means for conveying a stream of peas of mixed sizes through a tortuous path, yielding means for supporting portions of said conveying means, means for agitating said yielding means and thereby said conveying means and separate means for moving said conveying means.

5. An apparatus for grading peas comprising means for distributing a mass of mixed sizes of peas into a thin stratum, a perforated endless band for receiving the said thin stratum, means for moving said endless band continuously to convey said peas through said apparatus, vertically movable means supporting said band and means for imparting rapid vertical movement to said means to thereby agitate the peas being conveyed.

6. An apparatus for grading peas comprising means for distributing a mass of mixed sizes of peas into a thin stratum, a perforated endless band for receiving said thin stratum, continuous rotary means for moving said endless band to convey said peas, reciprocating means supporting a portion of said band on which peas are carried, means for imparting rapid reciprocation to said means to agitate the thin stratum of peas to effect a more thorough separation.

7. An apparatus for grading peas comprising means for distributing a mass of mixed sizes of peas into a thin stratum, a perforated endless band for receiving said stratum of peas, continuously moving means for supporting said band as to location and reciprocatory means supporting a portion of said band with combined rotary and reciprocatory means for reciprocating said supporting means, with separate means for receiving the peas that pass through the said perforations and other means for receiving the peas that cannot pass through the perforations.

8. An apparatus for grading green peas comprising means for delivering a thin stratum of peas, a series of grading means for receiving successively portions of said original mass and separating therefrom the smaller sizes, means for imparting a continuous forward movement to each mass while separation is taking place, each of said grading means having two distinct means of support, means for imparting to one of said supports a rapid agitation to facilitate the separation of the different sizes with independent means for receiving each separated size and conveying it away from the apparatus.

In testimony whereof I affix my signature.

JOHN SCHMIDT.